Jan. 19, 1971                R. E. KELLOGG                3,555,754
             PORTABLE SHELTER ASSEMBLY FOR PROTECTION FROM BAD
                         WEATHER AND COMPONENTS THEREOF
Filed Sept. 16, 1968                                    3 Sheets-Sheet 1

INVENTOR
Ronald E. Kellogg
BY
Scofield, Kokjer, Scofield & Lowe
ATTORNEYS

Jan. 19, 1971  R. E. KELLOGG  3,555,754
PORTABLE SHELTER ASSEMBLY FOR PROTECTION FROM BAD
WEATHER AND COMPONENTS THEREOF
Filed Sept. 16, 1968  3 Sheets-Sheet 2

INVENTOR
Ronald E. Kellogg

BY Scofield, Kokjer, Scofield & Lowe
ATTORNEYS

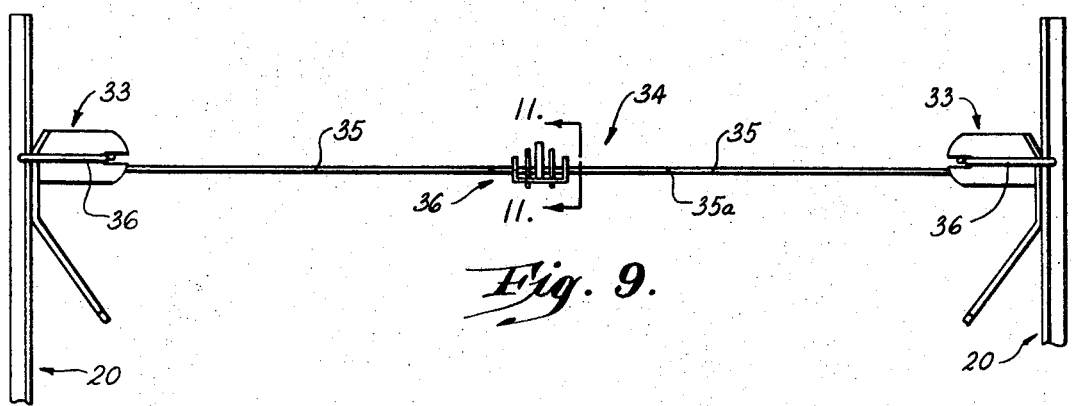
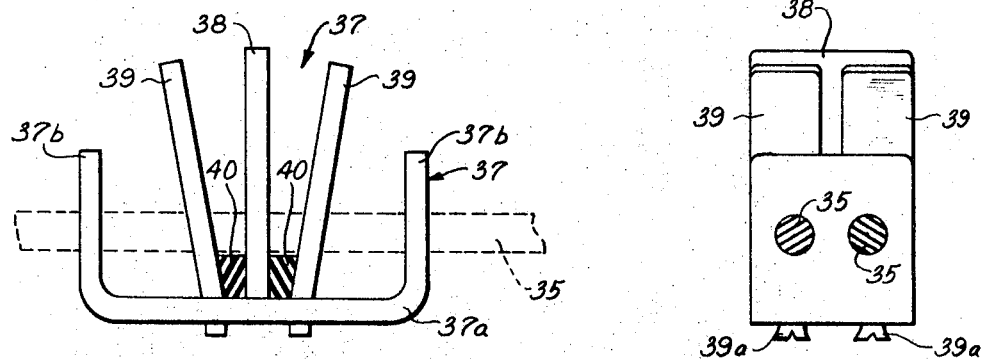
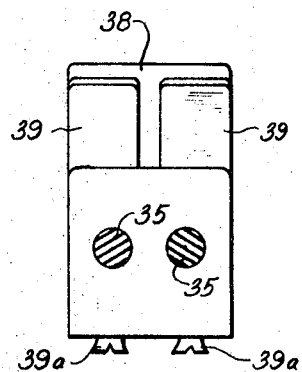
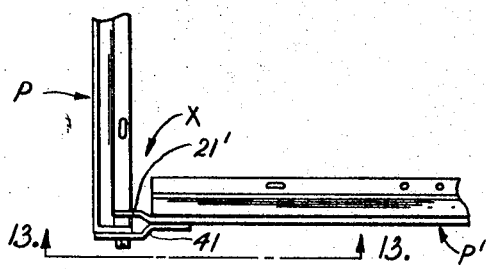
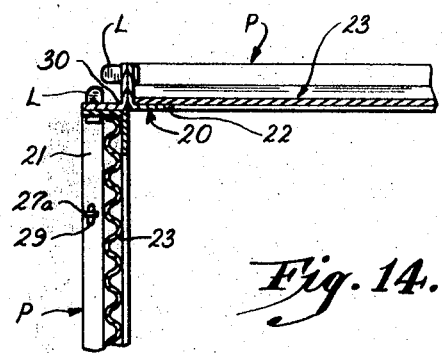
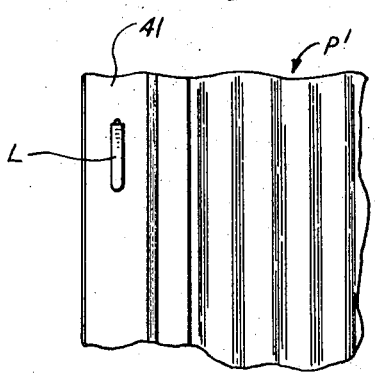
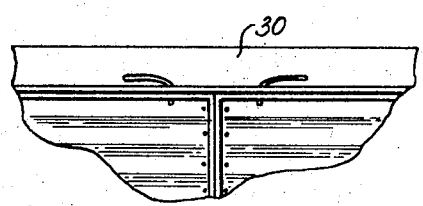
INVENTOR
Ronald E. Kellogg

United States Patent Office 3,555,754
Patented Jan. 19, 1971

3,555,754
PORTABLE SHELTER ASSEMBLY FOR PROTECTION FROM BAD WEATHER AND COMPONENTS THEREOF
Ronald E. Kellogg, Fremont, Nebr., assignor to Kelly Klosure, Inc., Fremont, Nebr., a corporation of Nebraska
Filed Sept. 16, 1968, Ser. No. 762,205
Int. Cl. E04b *1/40, 2/28*
U.S. Cl. 52—282          8 Claims

ABSTRACT OF THE DISCLOSURE

A self-supporting shelter is made up of structurally strong light transmitting panels which can be assembled in many different combinations by means of special quickly detachable fasteners and related supports. The fasteners comprise a member having a notched head and an exposed handle.

BACKGROUND AND SUMMARY OF THE INVENTION

Inclement weather is the bane of outdoor construction work. Not only does it affect the materials of construction and the ability to proceed, but also it materially impinges on the efficiency of the workers and the quality of the work. In the middle and north latitudes, the primary concern is cold and wintry weather.

The present invention is directed principally to the provision of a simple and highly effective means of providing weather protection to the work and the workers so that construction may proceed at full pace, from basic excavation through foundation pouring and wall erection in weather that otherwise would materially slow the job, if not shut it down entirely. In essence, the invention comprises an enclosure or shelter, and the components therefor, which can be quickly erected on the job, which can be put up in a wide variety of plans and sizes, which once erected permits ready transmission of daylight therethrough, which can withstand high wind loads and carry normal snow loads, and which can easily be disassembled, transported and again erected or stored during periods it is not required.

Other objects and features of the invention, together with the features of novelty appurtenant thereto, will appear in the course of the following description.

DETAILED DESCRIPTION

In the accompanying drawings, which form a part of the specification, and are to be read in conjunction therewith, and in which like reference numerals indicate like parts in the various views;

FIG. 9 is an enlarged side elevational view of the brace or spacer rod assembly seen in part in the right hand portion of FIG. 1;

FIG. 10 is an enlarged side elevational view of the brace rod connector disassociated from the brace or spacer assembly of FIG. 9;

FIG. 11 is an enlarged sectional view taken along the line 11—11 of FIG. 9 in the direction of the arrows;

FIG. 12 is a fragmentary sectional view showing a special formation for panels which are used in forming inside corners on a rectilinear shelter;

FIG. 13 is a fragmentary sectional view taken along line 13—13 of FIG. 12 in the direction of the arrows;

FIG. 14 is a fragmentary sectional view taken along the line 14—14 of FIG. 1 in the direction of the arrows; and FIG. 15 is a fragmentary elevational view of the upper edge of a shelter sidewall showing the corner connection angle for connecting the roof panels therewith.

Figure 1:
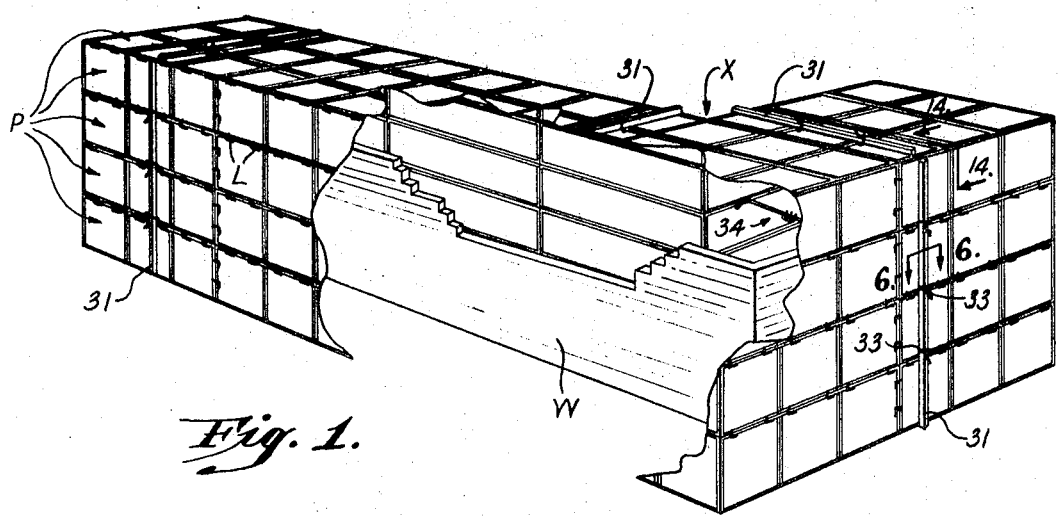
FIG. 1 is a perspective view of a typical enclosure or shelter which might be used in connection with the construction of a wall, part being broken away for purposes of illustration.
Figure 2:
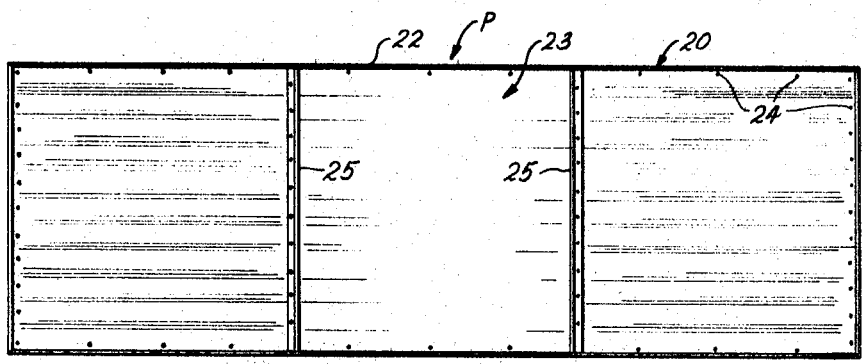
FIG. 2 is an enlarged view of a typical panel of which the shelter of FIG. 1 is constructed, the view being taken toward the normally outside face.

As noted above, FIG. 1 illustrates a typical shelter structure in accordance with the invention which, in this instance, has been erected in a generally L-shaped plan form to enclose a wall W in partial stage of construction. It should be understood at the outset that FIG. 1 is only provided as a means of illustrating a typical structure. As will become evident as the description proceeds, many, many different shelters of differing shapes and sizes and employing the principles of the present invention can be constructed. I therefore do not intend the invention to be in any sense limited to the specific arrangement of FIG. 1.

The shelter of FIG. 1 and other shelters contemplated by my invention are constructed by use of a plurality of individual rectilinear panels P, the details of which are shown and will be described in connection with FIGS. 2–5, inclusive.

The panels P are in each case made up of a substantially rigid rectangular open frame 20 constructed from lengths of right angle cross section material, preferably steel. In a typical and convenient size, they are twelve (12') feet by four (4') feet. The sides 21 of the frame are joined to the frame ends 21a at mitered corners by welding so that a strong structure is obtained.

The base flanges of the frame sides 21 and ends 21a lie in a common plane, while the other flanges project transversely to form a continuous rim 22. Seated within the rim and on the base flanges is a sheet 23 of translucent material. This sheet is of a length and width sufficient to fit within the perimeter of the rim 22. In its preferred form, the sheet is a glass fiber reinforced plastic panel having sinuous corrugations running lengthwise of the panel. The materials of which the sheet 23 are composed are readily available on the market and the exact composition thereof, other than that it be translucent and resistant to weather destruction, are not a part of my invention. As a suggesed composition, reference is made to Hungerford et al. Pat. No. 3,265,556, issued Aug. 9, 1966.

The margin of the sheet 23 is riveted at intervals to the base flanges of the frame members in order to securely affix the sheet to the frame. In addition, two transverse brace members 25 extend across the panel at equispaced intervals. These members 25 rest upon and are secured to the high points of the outside directed corrugations, again as by rivets, which are spaced along the brace members. The members 25, like the components of the frame, most conveniently are of angle cross section, having a base flange secured to the sheet and an outwardly projecting flange.

Figure 7:
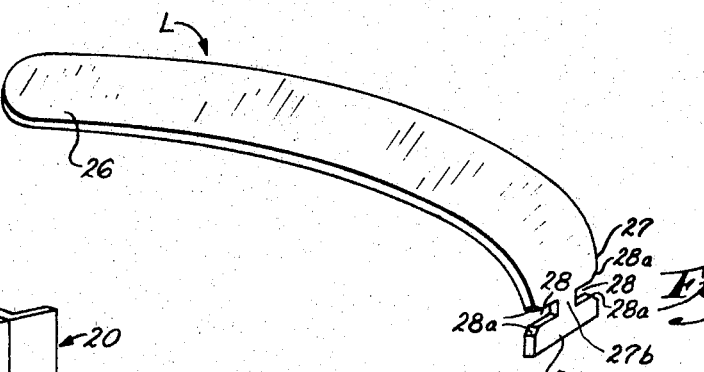
FIG. 7 is a perspective view of a typical panel locking member employed in connecting the panels together.

In assembling a structure like that of FIG. 1, panels P are placed in side by side relationship to establish planar wall sections. The panels are oriented with the rim 22 and brace members 25 on the outside of the structure. In FIG. 1 is shown, for example, a side wall running four panels high with the long axes of the panels parallel with the ground. Adjacent panels are connected together, both at the ends and at the sides, through a special locking arrangement which involves the use of the individual locking members L, seen in very small scale in FIG. 1, but shown in much larger scale in FIG. 7.

Each locking member L is generally L-shaped in configuration, having a handle 26 and a specially shaped head portion 27. The head portion 27 is provided with opposed notches 28, the walls of each of which are substantially parallel in the inner portion, but terminate in beveled surfaces 28a which, in effect, provide a flared mouth for each notch. The notches thus define a space between the main body of the head 27 and a cross head 27a connected by a narrow neck 27b.

Figure 3:
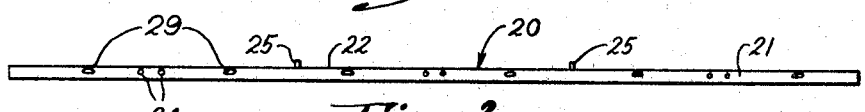
FIG. 3 is an edge elevation of the panel.
Figure 4:
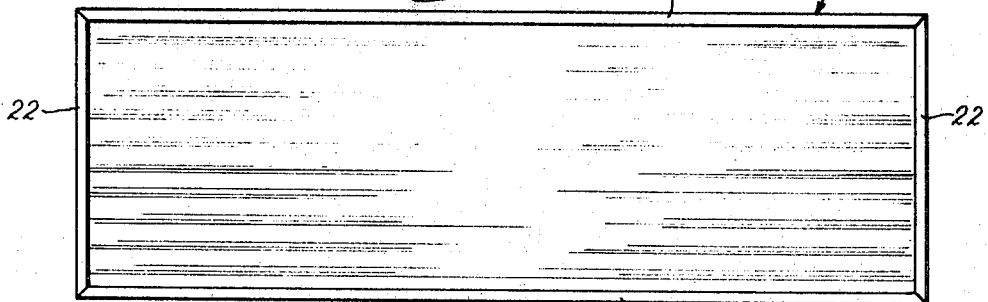
FIG. 4 is a view of the panel from the face opposite that of FIG. 2.
Figure 5:
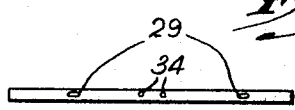
FIG. 5 is an end elevational view of the panel.

As can be seen in FIGS. 3 and 5, the end and side rim portions 22 of the panel are provided at intervals with elongated or oblong openings 29. These openings are oriented with the long axis of the opening running parallel with the long axis of the side or edge, as the case may be. In the illustrated panel, there are six such openings in the side rim flange and two in the end rim flange, all spaced uniformly therealong. These openings are of an over-all length and width slightly greater than the length and thickness of the cross head 27a of the locking member L, so that the cross head can be inserted therethrough with its long axis coincident with the axis of the slot.

When the panels P are placed in side to side or end to end abutting relationship, the openings 29 will register. To connect the panels together, a locking member L is utilized with each pair of registering openings. The width of the notch 28 in the locking member is made equal to or just slightly greater than the double thickness of the material of which the frame member 20 is constructed. Once the head 27a is inserted through the opening, the clamping member can now be turned 90° so as to bring the axis of the head 27a at the right angles to the axis of the slots. As this occurs, the edges of the slots will be engaged by the side walls of the notch 28 in the locking members. The flared entrance throats 28a to the notches permit ease in tightening the connections during the initial stages of turning, the notches permitting a gradual drawing together of the abutting rim portions. When the locking members are turned the full 90° the handle portion 26 lies parallel with the plane of the panel and the locking members are therefore in an out of the way position.

In a structure like that illustrated in FIG. 1, the side walls are joined by top panels P which form a roof. In this instance, the long axis of the panel runs between the walls. The manner of connecting the ends of the top panels to the upper side rim of the topmost side panels is illustrated in FIG. 14.

In order to effect the connection between the upright and horizontal panels, I employ a connector angle 30 which is a length of right angle steel material, much like that of which the frame is composed. I mount this angle to the uppermost edge of the topmost side panel by using clamps L in the same fashion earlier described for interconnecting the panels P. The angle section 30 is provided with oblong openings like openings 29, these openings being provided in both flanges or legs thereof. The horizontal top panel and edge is then placed in registry with and adjacent the upright leg of the angle section 30 and additional clamps are employed to join the panels together.

In utilizing connector members like member 30, it is important that the angle be of such a length and the openings for the locking members L be so located that when the openings in the connector member are in register with the openings of the frame members the connector member will bridge a joint between adjacent panel sections. In other words, the breaks between the ends of the members 30 should be located other than at the joints between adjacent panels. Used in this way, the connector member contributes to the lateral stability of the structure. The foregoing arrangement is illustrated in FIG. 15.

Additional strength for the structure can be provided, when required, through the use of structural supporting members 31, which most conveniently take the form of conventional 2 x 4 boards. These members 31 are of a length such that they will, when laid across a course of panels P, span the width of several. For example, in FIG. 1 they are shown as having an approximate length of twelve (12′) feet, although other lengths consistent with the space requirements will do.

Figure 6:
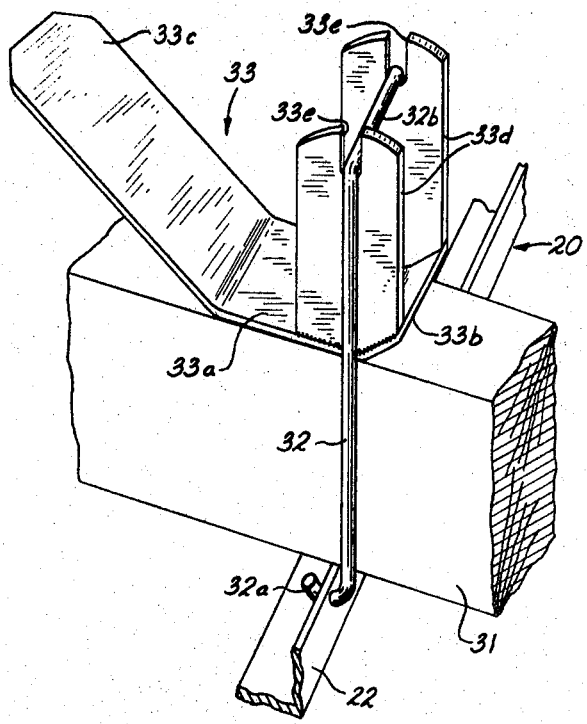
FIG. 6 is an enlarged fragmentary perspective view showing a quick release clamp in operative engagement with a supplemental support rib or bar and illustrating the manner of connection of the clamp to a panel component.

The structural members 31 are easily attached to the panel assembly. The clamp assembly illustrated in FIG. 6 is utilized for this task. The clamp assembly includes the generally U-shaped link member 32 and the member 33.

Link member 32 is constructed of heavy wire or rod stock bent into the form of a U and with the legs terminating in open hook portions 32a which are adapted to be inserted into pairs of spaced openings 34 formed at intervals in the side and end rim flanges of the frame members 20. The width of the U-shaped member and the spacing of openings 34 is at least as great as the width of the 2 x 4, although if other structurals of boards or other widths are to be accommodated, obviously the spacing can be changed as desired during original manufacture.

During hooking of the hooks 32a into the openings of the frame, the camming member 33 is usually disengaged from the bight portion 32b of the U-shaped member in order to permit easy manipulation of the link member.

Clamping lever 33 operates in cooperation with link member 32 to provide a clamping force which serves to firmly connect the member 31 to the structure. The clamping lever includes a metallic strip bent to provide three parts: the flat central portion 33a, which, when the lever is in clamping position, bears tightly against the outer surface of the member 31, being held thereagainst by link 32; the upturned inclined rocker portion 33b, which defines with portion 33a a break line or corner; and also an upturned but oppositely inclined handle 33c. Projecting upwardly on opposite sides of the clamping lever and firmly secured thereto are similar parallel ears 33b, each of which is provided with an end notch 33e therein. The length of the ears and depth of the notches and the relation thereto of the link 32 is such that the positioning of the components in the condition illustrated in FIG. 6, puts the legs of member 32 in tension.

The notches 33 are so located relative to the juncture of flat portion 33a with the upturned rocker portion 33b that a line intersecting the axis of the bight 32b and passing downwardly through the upper bearing surfaces of the openings in the member 32 will intersect the flat portion 33a at a point offset from the break line between the flat portion and upwardly inclined portion 33b. The length of the flat portion is such as to balance the moment exerted by the tension in the link member tending to pivot the lever member 33b counterclockwise, as viewed in FIG. 6.

To release the clamping assembly, it is necessary only to grasp the handle 33c and pull upwardly. The lever will pivot about the break or corner line between sections 33a and 33b, and as rotation continues the tension in the link, and consequently the clamping pressure, will be relieved.

Preferably a clamp assembly of the nature described is employed at each joint between the panels when it is desired to reinforce the structure with the structural members 31.

Figure 8:
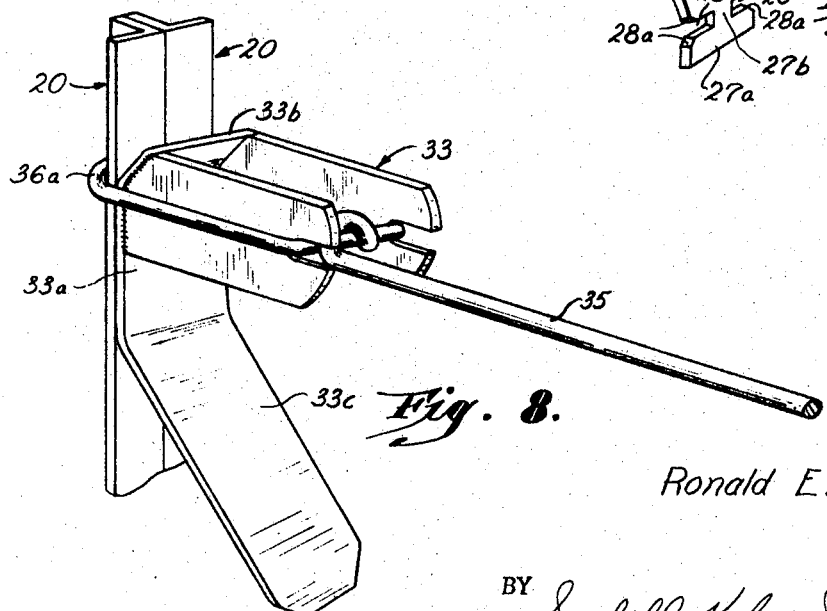
FIG. 8 is an enlarged fragmentary perspective view illustrating the use of the clamp of FIG. 6 in the context of providing support for a transverse brace rod.

The clamping lever 33 also provides a convenient quick release attaching mechanism for connecting the ends of the internal spacer assembly 34, which is illustrated in detail in FIGS. 8, 9 and 10 and can be partially viewed in FIG. 1, to the interior wall structure.

Referring to the above-identified figures, the internal brace or spacer assembly includes a pair of rods 35 which extend inwardly from the opposite inside walls of the structure (represented by frame sections 20). The rods 35 are not aligned; instead they are parallel and in a common horizontal plane. The rod end of the left hand rod 35 is indicated in FIG. 9 at 35a. The same relationship obtains with the right hand rod.

The ends of rods 35 adjacent the respective side walls are secured thereto by means of an attaching mechanism including clamping levers 33 and U-shaped link members 36. The link members 36 differ from the links 32 earlier described in two respects; first, they are shorter, and secondly, the ends have inturned end portions 36a, rather than hooks extending at right angles to the plane of the U. These end portions are adapted to engage behind and on the base flange of frame sections 20. Incidentally, in FIGS. 8 and 9, the frame sections are shown as separated from the sheets. This is merely for purposes of illustration. If necessary, small openings can be cut in the sheet to receive the ends 36a.

The two rods 35 are interconnected near the center of the structure by the connector assembly 37, which is illustrated in detail in FIGS. 10 and 11.

The connector assembly 37 has as its basic component the U-shaped structure having the lower bight portion 37a and the upstanding legs 37b. The connector assembly is symmetrical. As best seen in FIG. 11, the rods are received through the legs 37b in side by side apertures formed therein. A similarly apertured center bar or partition 38 is secured to the bight of the U and extends upwardly therefrom parallel with legs 37b. The rods pass through the apertures in the partition, also.

Extending upwardly on opposite sides of the partition 38 are two pairs of side by side friction locking members 39. As can best be seen in FIG. 11, these members each have lower tongue portions 39a which are received through appropriate apertures in the bight 37a of the connector assembly. The apertures are sufficiently large as to permit the members 39 to wobble toward and away from plate 38. The tongue portions 39a are split and spread to retain the plates in place. Each locking member 39 is provided with an aperture which, when the locking member is titled to an upright position, or parallel with the partition 38, is in alignment with and will slidably receive the rod concurrently with the apertures in the partition and leg members 37b. However, each locking member is biased toward an inclined position in which the opening is out of registry with the stationary openings by means of a rubber or other resilient packing 40 which provides a spring effect.

In assembling the spacer assembly, the rods are normally initially connected with the central connector member 37. Their position relative to the connector member can easily be adjusted by relieving the pressure exerted by locking members 39 thereon, which is accomplished by pinching the upper ends of the locking members together. While holding the locking members, the rods are extended outwardly relative to the connector member until the extension is such as to permit engagement of links 36 with the frames and the locking of the clamping levers. Further adjustment of the rods can be made as desired. It will be understood that the locking members 39, when they are in their outwardly biased position, engage and establish lateral pressures on the rods at the apertures in the legs 37b and the central partition 38 as well as in the locking members, the total sum of such pressures being such as to resist any longitudinal movement of the rods relative to the connector assembly.

The brace assemblies 34 can be employed where needed. Normally, they are not required in low wall structures, but as the height of the structure increases, they become more desirable.

In assembling the structure, and as earlier noted, it is most desirable that the panels be so oriented that the rims 21 are on the outside of the structure. This poses some problems in connection with the establishing of an inside corner, as at X in FIG. 1. I have, however, developed a special panel arrangement for such corners, the principles of which are illustrated in FIGS. 12 and 13.

The panel P which forms one side of the corner is a conventional panel. The other panel P' is conventional except that along the edge thereof which will be in the corner itself, the rim flange has been turned outwardly as at 21' and is formed with a slight upward or outward offset. This outturned flange 21' runs for substantially the full width of the panel. Running adjacent and parallel to the flange 21' and welded to the frame is another section 41 which is offset in the direction opposite from the offset of flange 21'. The member 41 and flange 21' form between them a channel or groove which is adapted to mesh and interfit with the upright rim of the adjoining panel.

It will be evident that in order to interfit the lengths of the outwardly bent flange portions, flange 21' must be somewhat less in length than the over-all width of the panel, since it must fit within the parallel side rim flanges.

The outside leg 41 of the channel or groove is provided with the oblong openings adapted to register with the openings in the conventional panels so that the locking members L can be employed, as illustrated in FIG. 13, to connect the panels P' with the conventional panels.

While I have illustrated a panel P' in which the corner channel is formed on one end edge of the panel, it will be understood that the same principles can be utilized in arrangements where it is desired to have the side wall panels oriented with the long axis vertical rather than horizontal.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a light transmitting protective enclosure, the combination of
   a plurality of a similar, substantially rigid rectilinear open frame members having side edges and end edges, said frame members arranged in each abutting coplanar relationship,
   a translucent nonmetallic sheet connected with each said frame members, said sheet of like geometry with its associated frame member and positioned within and secured around its edges to said frame member,
   the side and end edges of the frame members projecting transversely beyond the major plane of the sheet and all terminating in substantially the same plane to provide a flanged rim of substantially uniform depth around the sheet, and
   manual fastener means insertable and removable through aligned openings in abutting rim portions for releasably interconnecting the abutting rim portions of the frame members at spaced intervals therealone, said fastener means having exposed hand grips accessible when the panels are connected with one another.

2. The combination as in claim 1, including in addition at least one elongate structural member extending across at least two of said frame members and parallel with said sheet with the structural member intersecting and engaging portions on the outer edges of said flanged rims, and clamping means for releasably connecting said member to said rims at the intersection.

3. The combination as in claim 2, said clamping means including a tension member connected at one end to said rim and extending outwardly past the structural member, and a releasable lever member connected with the outer end of said tension member and operable to be engaged with said structural member and tauten said tension member thereby to clamp said structural member against said rims.

4. The combination as in claim 1, said abutting rim portions having registering elongated openings therethrough, said fastener means comprising a locking member having a notched head insertible through a pair of said openings and twistable into a locking position in which portions of the abutting rim portions are retained in said notches.

5. The combination as in claim 1, wherein two groups of said frame members are spaced in parallel relationship and including adjustable length spacer means extending from one group to the other.

6. The combination as in claim 5, said spacer means comprising a pair of rods, one connected with each said group and extending toward one another, and a connector interconnecting said rods and having a normally engaged but releasable friction grip on each rod.

7. The combination as in claim 1, including an additional frame member positioned at a substantially right angle with respect to one of said frame members and defining a corner therewith, said additional frame member having along the edge thereof adjacent the corner a channel adapted to receive and interfit with a portion of the flanged rim on the said one frame member.

8. The combination as in claim 1, including an additional frame member positioned at an angle with respect to one of said frame members and defining a corner therewith, a corner member positioned between the portions of the rims running along the apex of the corner, and releasable fastener means joining said portions to said corner member.

References Cited

UNITED STATES PATENTS

| | | | |
|---|---|---|---|
| 1,187,990 | 6/1916 | Hawkins | 52—582X |
| 1,700,920 | 2/1929 | Campbell | 52—282 |
| 2,268,907 | 1/1942 | Scott | 52—376 |
| 3,113,434 | 12/1963 | Phillips | 52—475 |

FOREIGN PATENTS

| | | | |
|---|---|---|---|
| 538,142 | 1941 | Great Britain | 52—584 |

JOHN E. MURTAGH, Primary Examiner

U.S. Cl. X.R.

52—477, 489, 584, 585